Sept. 9, 1924. Re. 15,912

K. L. HERRMANN

HOBBING MACHINE

Original Filed April 17, 1922 2 Sheets-Sheet 1

INVENTOR
KARL L. HERRMANN
BY P. M. Pomeroy
ATTORNEY

Sept. 9, 1924. Re. 15,912

K. L. HERRMANN

HOBBING MACHINE

Original Filed April 17, 1922 2 ~~Sheets~~-Sheet 2

INVENTOR
KARL L. HERRMANN
BY P. M. Pomeroy
ATTORNEY

Reissued Sept. 9, 1924. Re. 15,912

UNITED STATES PATENT OFFICE.

KARL L. HERRMANN, OF DETROIT, MICHIGAN, ASSIGNOR TO STUDEBAKER CORPORATION, A CORPORATION OF NEW JERSEY.

HOBBING MACHINE.

Original No. 1,444,247, dated February 6, 1923, Serial No. 554,060, filed April 17, 1922. Application for reissue filed January 9, 1924. Serial No. 685,281.

*To all whom it may concern:*

Be it known that I, KARL L. HERRMANN, a citizen of the United States of America, residing at Detroit, in the county of Wayne and State of Michigan, have invented certain new and useful Improvements in Hobbing Machines, of which the following is a specification, reference being had therein to the accompanying drawings.

This invention relates to gear cutting machines and more particularly to that class of such machines known as hobbing machines.

An object of the invention is to simplify the construction whereby a minimum number of gears is employed to secure the proper relative movement between the hob and work and to provide certain other new and useful features in the construction, arrangement and combination of parts.

With the above and other ends in view the invention consists in the matters hereinafter set forth and more particularly pointed out in the appended claims, references being had to the accompanying drawings, in which—

Figure 1:
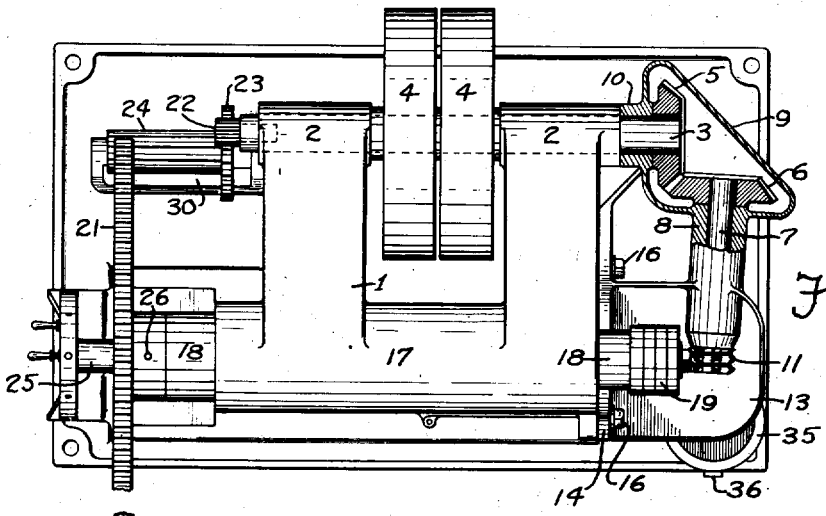
Figure 1 is a plan view of the machine illustrative of an embodiment of the invention and with portions broken away and in section to more clearly show the construction.
Figure 2:
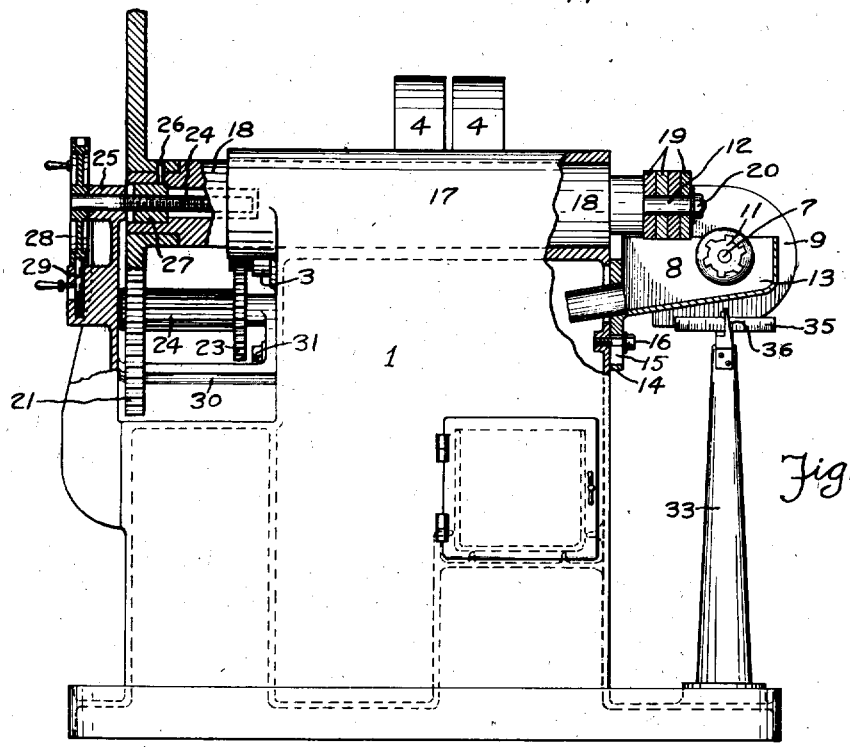
Figure 2 is a side elevation of the same with portions broken away and in section.
Figure 3:
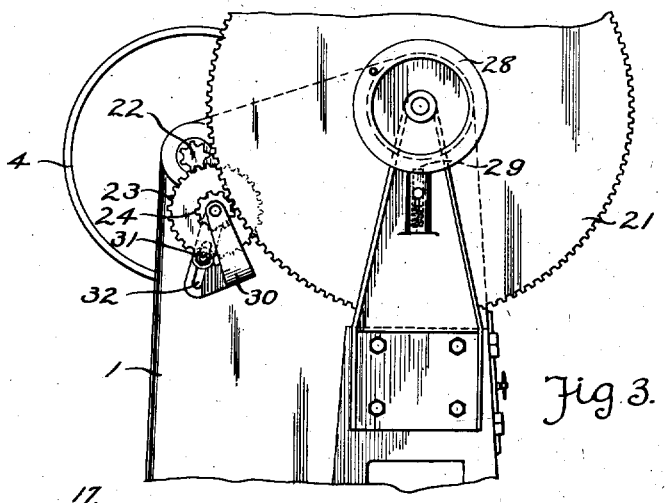
Figure 3 is a partial end elevation of one end of the machine.
Figure 4:
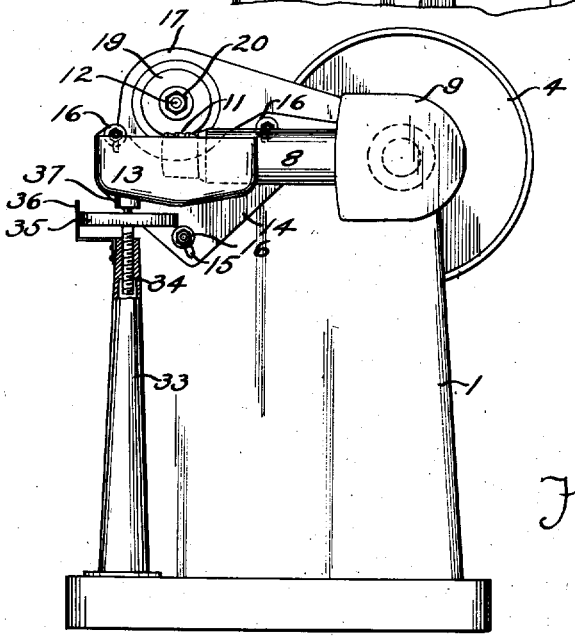
Figure 4 is an elevation of the opposite end.

In the cutting of gears or worm wheels by means of a cutter known as a hob, it is necessary to rotate the work or blank in timed relation to the rotation of the hob and to move the blank and hob relatively and in timed relation to the other movements. These relative timed movements have been secured through the employment of a complicated gearing for transmitting the proper motion but because of such complication, and the large number of gears employed there is a liability of inaccuracy in the work and the machine is expensive to manufacture and to keep in running condition. It is an object of the present invention to provide a construction in which a minimum number of gears is employed, thus simplifying the construction and eliminating many of the difficulties and disadvantages of the more involved construction.

As illustrative of an embodiment of the invention a machine is shown in the accompanying drawings comprising a suitable supporting frame 1 provided with bearings 2 for a main drive shaft 3 which is provided intermediate these bearings with belt pulleys 4. Secured upon one end of the shaft 3 is a beveled gear 5 in mesh with a like beveled gear 6 secured upon a shaft 7 mounted in a bearing 8 formed integral with a gear casing 9 which gear casing is provided with a bearing 10 to receive the shaft 3 and swing about the axis of said shaft. The shaft 7 forms the spindle upon which the rotary tool or hob 11 is secured and to hold the casing 9 carrying said spindle, in proper adjusted position relative to a work spindle 12, and also to form a pan or receptacle beneath the hob or cutter, a pan 13 is secured integral with the bearing portion 8 of the casing 9 and this pan has ears 14 thereon provided with slots 15 to receive bolts 16 engaging screwthreaded openings in the frame 1 for adjustably holding the casing 9 of which the pan 13 forms a part, the side of said pan being securely held against the side of the frame by means of said bolts. By loosening these bolts and swinging the casing together with the spindle 7 carried thereby about the axis of the main driving shaft 3, the hob or cutter 11 may be adjusted toward or from the work.

A long bearing 17 is provided on the frame 1 for the enlarged portion 18 of the work carrying spindle 12, the work consisting of a series of blanks 19 being secured upon the reduced end portion of this spindle in any suitable manner as by a nut 20. Mounted upon the opposite end of the spindle 18 is a large spur gear 21 by means of which the work spindle is rotated at a very low speed, motion being transferred from the main drive shaft 3 through a small pinion 22 on the end of the drive shaft which pinion is adapted to mesh with a spur gear 23 which is secured to or formed integral with an elongated gear or pinion 24 in mesh with the large pinion 21. The speed of rotation of the main drive shaft is therefore through the several gears greatly reduced so that a very slow rotation will be imparted to the work spindle in timed relation to the rotation of the hob and the hob spindle is mounted at the proper angle relative to the longitudinal axis of the work spindle to cause the hob to form spur gear teeth upon the peripheries of the blanks when the work spindle is rotated in proper timed relation to the rotation of the hob and also moved longitudinally to present the blanks to the hob, the horizontal plane of the work spindle being above the plane of the axis of the hob so that upon longitudinal movement of the work spindle the work will be moved across the hob, the hob being held in the position to which it is adjusted relative to the work spindle, by adjusting the casing 9 rotatively about the axis of the driving shaft 3. The feeding of the work to the hob is accomplished by providing a screw shaft 24 which shaft is mounted in a suitable bearing 25 on the frame and held by said bearing against longitudinal movement but free to turn therein, said screw shaft extending into a bore in the end of the spindle 18. Within the bore of the spindle is secured in any suitable manner as by a pin 26, a nut 27 having an internal screw thread to receive the screwthreaded shaft 24. Upon the transmission of motion to the large gear 21, the work spindle will be slowly rotated and as the screw shaft 24 is held against rotation by means of a hand wheel 28 on its outer end having a lock bolt 29 for locking the wheel against turning, the turning of the spindle which carries the nut 27 will feed the spindle forwardly and bring the work carried by its opposite end into engagement with the hob. This feeding movement of the work spindle is therefore in timed relation to the rotation of the spindle and the rotation of the hob and by properly proportioning the different speeds of rotation and the pitch of the screw 24, the desired form of teeth will be cut by the hob in the peripheries of the blanks as these blanks are fed horizontally and with a simultaneous movement across the hob. When the spindle has reached the end of its longitudinal movement and the blanks have been carried across the hob and the cutting operation completed, the spindle may be quickly returned to the position shown in the drawings, by releasing the latch bolt 29 and rotating the screw shaft 24 by means of a hand wheel 28. The finished work is then removed from the spindle and other blanks secured in place thereon and the operation repeated.

As the work spindle is moved longitudinally, it carries the large gear wheel 21 with it, said gear wheel sliding in mesh with the long gear 24 during the reciprocation of the spindle. The gears 23 and 24 are idler gears for transmitting motion from the pinion 22 to the large gear 21 and these gears 23 and 24 are carried by a suitable bracket 30 which is adjustably secured to the frame 1 by means of a locking bolt 31 passing through a slot 32 in the bracket. The meshing engagement of these idlers with their gears may therefore be adjusted or may be removed and others substituted having a different number of teeth for the purpose of changing the ratio of rotation between the work spindle and the hob or spindle. The depth of tooth to be formed on the blanks may be varied by adjusting the hob toward or from the blanks, said adjustment being accomplished by swinging the casing 9 which carries the hob spindle, about the axis of the driving shaft 3 as previously described, and to assist in this adjustment which must of necessity be very minute and accurate, a pedestal 33 is provided beneath the pan 13 and in the upper end of this pedestal is mounted a screw shaft 34 carrying an index wheel 35 upon its upper end with a pointer 36 secured to the pedestal and extending across the face of the wheel, the upper end of the shaft abutting against a lug 37 on the lower side of the pan so that by turning the screw shaft by means of the index wheel, the casing or frame of which the pan forms a part and which carries the hob spindle, may be accurately raised or lowered and such adjustment will be indicated by the wheel. After the proper adjustment of the hob relative to the work is thus secured, it is held in adjusted position by tightening the bolts 16. By mounting the hob spindle for rotation in fixed relation to the work, and arranging the work carrying spindle for movement across the hob, the necessary relative and timed rotative and feeding movements may be secured through the employment of a minimum number of gears and a very simple and efficient construction.

Obviously any desired relative speeds of work spindle and hob may be secured to suit the particular work in hand and it is also obvious that other changes may be made within the scope of the appended claims, in the particular combination and arrangement of parts, without departing from the spirit of the invention and I do not therefore limit myself to the particular construction shown.

What I claim is:—

1. In a machine of the class described, the combination of a generating tool spindle and a work carrying spindle one of which is longitudinally movable angularly across the axis of the other, a stationary support in which said work carrying spindle is journalled, means for driving said spindles simultaneously in timed relation to each other, and means including a non-rotatable member and a member rigid with said longitudinally movable spindle for moving the latter longitudinally.

2. In a machine of the class described, the combination of a generating-tool spindle and a work carrying spindle one of which is longitudinally movable angularly across the axis of the other, means for driving said spindles simultaneously in timed relation to each other, means including a non-rotatable member and a member rigid with said longitudinally movable spindle for moving the latter longitudinally, and independent means for operating the normally non-rotatable member to cause the longitudinally movable spindle to move to its initial position.

3. In a machine of the class described, the combination of a generating-tool spindle and a work carrying spindle, one of which is longitudinally movable angularly across the axis of the other a stationary support in which said work carrying spindle is journalled, means for driving said spindles simultaneously in timed relation to each other, and means including a screw and a nut one of which is normally non-rotatable and the other rigid with said longitudinally movable spindle for moving the latter longitudinally.

4. In a hobbing machine, the combination of a main drive shaft and a hob spindle in radial relation thereto, means for holding said spindle in a fixed position, a work carrying spindle longitudinally movable angularly across the axis of the hob spindle, and means for imparting a rotary motion to said spindles in timed relation to each other and a longitudinal movement to the work spindle in timed relation to the relative movements of said spindles.

5. In a hobbing machine, the combination of a hob spindle, means for holding said spindle in a fixed position, a work carrying spindle longitudinally movable angularly across the axis of the hob spindle, means for imparting a rotary motion to said spindles, and means comprising a plurality of elements for moving said spindle longitudinally only one of said elements being movable and solely by the rotation of said work spindle.

6. In a hobbing machine, the combination of a hob spindle, means for holding said spindle in a fixed position, a work carrying spindle longitudinally movable angularly across the axis of the hob spindle, means for imparting rotary motion to said spindles simultaneously in timed relation to each other, and means including a normally non-rotatable member and a member carried by the work spindle and operative by the rotation thereof for moving said spindle longitudinally.

7. In a hobbing machine, the combination of a hob spindle, means for holding said spindle in a fixed position, a work carrying spindle longitudinally movable angularly across the axis of the hob spindle, a main driving shaft, means for transmitting motion from said shaft to said spindles to rotate the same in timed relation to each other, and means including a screw and nut one of which is normally non-rotatable and the other rotated by said work spindle for moving said spindle longitudinally.

8. In a hobbing machine, the combination of a hob spindle, a rotating shaft, a member extending radially from and supported to swing about the axis of said shaft and forming an adjustable support for said hob spindle, means for holding said member in the position to which it is swung about said shaft, a longitudinally movable work spindle arranged at an angle to the axis of the hob spindle to project the work carried thereby across a hob carried by the hob spindle, gearing between the shaft and the hob spindle, and means operated solely by the rotation of the work spindle for moving said work spindle longitudinally in timed relation to the rotative movements of said spindles.

9. In a hobbing machine the combination of a work spindle, a main drive spindle parallel thereto and a pivotally supported hob spindle whose pivotal line crosses its axis, and having a hob receiving portion adjustable toward said work spindle, means for producing timed rotation and cross movement between, and for adjusting and holding the relative positions of, said work spindle and said hob spindle.

10. In a hobbing machine, a work spindle and a hob spindle having a hob receiving portion, a hob mounted thereon, means for simultaneously rotating said spindles in timed relation, said hob spindle pivoted about a line crossing its axis, and means for varying the distance between said work spindle and said hob receiving portion along an arcuate path through the axis of said work spindle and said hob receiving portion.

11. In a gear cutting machine, the combination of a work spindle, and a cutter spindle having a cutter thereon; said cutter spindle pivoted about a line crossing its axis; one of said spindles being adjustable toward the other along a circumferential path; means for producing timed rotation and cross movement between, and for holding the relative position of, said elements.

12. In a hobbing machine, a hob spindle pivoted about a line crossing its axis, a hob mounted on said spindle, and a work spindle, means for simultaneously rotating said spindles in timed relation the distance between the work spindle and hob spindle being adjustable along an arcuate path and the distance between said line and the axis of the work spindle being invariable.

13. In a hobbing machine, a non-swinging longitudinally movable work spindle, and a swinging non-longitudinally movable hob spindle having a hob receiving portion thereon, a hob mounted on said spindle, and the distance between said work spindle and said hob receiving portion being variable in an arcuate path through the axis of the work spindle and about a center line which crosses the axis of the hob spindle.

14. In a hobbing machine, the combination of a hob spindle, means for holding said spindle in a fixed relation, a work-carrying spindle longitudinally movable angularly across the axis of the hob spindle, means for imparting a rotary motion to said hob spindle, a driving device mounted on and movable with said work-spindle, means for driving said device, and means operated by rotation of said work-spindle for moving said work-spindle longitudinally.

15. In a hobbing machine, the combination of a hob spindle and a work-carrying spindle one of which is longitudinally movable angularly across the axis of the other, means for imparting a rotary motion to said longitudinally movable spindle including a gear mounted on said longitudinally movable spindle and movable therewith and a gear constantly in mesh with said first-mentioned gear, and means including a nut and a screw one of which is stationary and the other secured to said longitudinally movable spindle for moving the same longitudinally.

16. In a hobbing machine, the combination of a hob spindle and a work-carrying spindle one of which is longitudinally movable angularly across the axis of the other, means for imparting a rotary motion to said longitudinally movable spindle including a gear mounted on said longitudinally movable spindle and movable therewith and a fixed long gear constantly in mesh with said first-mentioned gear and in sliding relation thereto, and means including a nut and a screw one of which is stationary and the other secured to said longitudinally movable spindle for moving the latter longitudinally.

17. In a hobbing machine, the combination of a hob spindle, a work-carrying spindle, one of which is longitudinally movable angularly across the axis of the other, means for imparting rotary motion to said spindles in time relation, and means comprising a nut and a screw one of which is stationary and the other secured to said longitudinally movable spindle for moving the latter longitudinally, the normally stationary member being operable to return the longitudinally movable spindle to its initial position.

18. In a hobbing machine, the combination of a hob spindle, a work-carrying spindle, one of which is longitudinally movable angularly across the axis of the other, means for imparting rotary motion to said spindles in timed relation, means comprising a nut and a screw one of which is normally stationary and the other secured to, and mounted within, said longitudinally movable spindle for moving the latter longitudinally, and a hand-wheel on the normally stationary member for rotating the latter to return the longitudinally movable spindle to its initial position.

19. In a hobbing machine comprising a work spindle, a rotary shaft, a hob spindle, and means for driving said spindles and shaft in timed relation, said shaft and said work spindle being parallel and the axis of the hob spindle being across the axes of said first-mentioned spindle and shaft and in substantially the same plane as the axis of said shaft.

20. In a hobbing machine comprising a work spindle, a rotary shaft, a hob spindle, gearing between said rotary shaft and said spindles for driving said spindles and shaft in timed relation, said shaft and said work spindle being parallel and the axis of the hob spindle crossing the axes of said first-mentioned spindle and shaft and in substantially the same plane as the axis of said shaft, and means for moving one of said spindles longitudinally angularly across the axis of the other.

21. In a hobbing machine comprising a work spindle, a rotary shaft, a hob spindle, means including gears between said hob spindle and shaft and also sliding intermeshing gears between said work spindle and shaft for driving said spindles and shaft in timed relation, said shaft and said work spindle being parallel and the axis of the hob spindle crossing and in substantially the same plane as the axis of said shaft, and means, comprising a nut and a screw one of which is stationary and the other secured to said work spindle for moving the latter longitudinally.

22. In a hobbing machine comprising a work spindle, a rotary shaft, a hob spindle, means for driving said spindles and shaft in timed relation, said shaft and said work spindle being parallel and the axis of the hob spindle being across the axes of said first-mentioned spindle and shaft and in substantially the same plane as the axis of said shaft, a casing supporting said hob spindle and pivotally supported on said shaft to permit angular adjustment of the hob spindle with respect to the work spindle, and means for securing the casing in adjusted position.

23. In a hobbing machine comprising a work spindle, a rotary shaft, a hob spindle, means including gears for driving said spindles and shaft in timed relation, a casing carrying said hob spindle and pivoted on said shaft to permit angular adjustment of the hob spindle with respect to the work spindle, said casing also forming a housing for the gearing between said shaft and hob spindle, and means for adjusting said casing.

24. In a hobbing machine, a work spindle and a hob spindle having a hob receiving portion thereon, one of said spindles being pivoted about a line crossing the axis of one of said spindles, a hob on said receiving portion, means for varying the distance between said work spindle and said hob along an arc through the axis of the work spindle and said hob, and means for rotating said spindles simultaneously in timed relation.

25. A hobbing machine comprising a hob supporting spindle having a hob mounted thereon and a work supporting spindle, a prime mover, an intermediate shaft operatively connected intermediate its ends directly to said prime mover, a bevel-gear mounted at one end of said intermediate shaft, and a spur-gear mounted at its other end, a bevel-gear on said hob supporting spindle meshing directly with first-mentioned bevel-gear for driving the hob-supporting spindle, means including a spur-gear directly meshing with said above-mentioned spur-gear for driving the work-supporting spindle, and means for effecting a progressive relative translation between said spindles in a direction parallel with the work-supporting spindle.

26. A hobbing machine comprising a hob supporting spindle having a hob mounted thereon and a work supporting spindle, a power driven shaft, a prime mover operatively connected directly to said shaft, a bevel-bear secured directly to one end of said shaft and a spur-gear secured directly to its other end, a bevel-gear meshing directly with said first-mentioned bevel-gear and mounted directly on one of said spindles, means consisting of spur gears, one of which meshes directly with said first-mentioned spur-gear for propelling the other spindle, and means for effecting a progressive relative translation between said spindles in a direction parallel with the work-supporting spindle.

Signed by me at Detroit, Michigan, U. S. A., this 7 day of Jan., 1924.

KARL L. HERRMANN.

Witnesses:
HODGSON S. PIERCE,
DONAL B. WAITE.